United States Patent [19]
Fuchs et al.

[11] Patent Number: 6,139,756
[45] Date of Patent: Oct. 31, 2000

[54] METHOD OF TREATING SWIMMING POOL WATER

[75] Inventors: Rainer Fuchs, Mömbris/Hohl; Michael Huss, Eschborn, both of Germany

[73] Assignee: Degussa-Hüls AG, Germany

[21] Appl. No.: 09/455,504

[22] Filed: Dec. 6, 1999

[30] Foreign Application Priority Data

Dec. 5, 1998 [DE] Germany ............................ 198 56 198

[51] Int. Cl.⁷ ...................................................... C02F 1/72
[52] U.S. Cl. ............................................. 210/759; 210/169
[58] Field of Search ..................................... 210/749, 754, 210/759, 764, 169

[56] References Cited

U.S. PATENT DOCUMENTS 5,384,045  1/1995  Chmieliewski et al. ................. 210/169
5,779,914  7/1998  Brown et al. ............................ 210/759

FOREIGN PATENT DOCUMENTS

104341A2  4/1984  European Pat. Off. .

*Primary Examiner*—David A. Simmons
*Assistant Examiner*—Betsey Morrison Hoey
*Attorney, Agent, or Firm*—Pillsbury Madison & Sutro LLP

[57] ABSTRACT

A method of treating water for a swimming pool comprising chlorination of the water, and filtration of the water using a fixed-bed filter with periodic backflushing of the filter using wash water to which a disinfectant has been added. The disinfectant is a peroxycarboxylic acid with one to six carbon atoms is used as disinfectant, preferably a solution containing peroxyacetic acid and/or peroxyformic acid and hydrogen peroxide. The method results in an improvement of the quality of the swimming-pool water and of the used wash water.

12 Claims, No Drawings

METHOD OF TREATING SWIMMING POOL WATER

CROSS-REFERENCE TO RELATED APPLICATION

This application claims priority from German Application No. 198 56 198.9, filed on Dec. 5, 1998, the entire disclosure of which is hereby incorporated herein by reference.

BACKGROUND OF THE INVENTION

1. Field of the Invention

The invention relates to a method of treating swimming pool water which includes chlorination of the swimming-pool water and filtration of the swimming-pool water via a fixed-bed filter, with periodic backflushing of the filter with wash water to which a disinfectant is added. The backflushing process of the invention results in a distinctly improved quality of the swimming-pool water, less contamination of the drained-off wash water with harmful substances and reduced need for addition of chlorine.

2. Background Information

In order to maintain the quality of swimming-pool water, it must be purified in a continuous preparation system in order to comply with hygienic requirements. The method for treating swimming-pool water comprises filtration of the swimming-pool water via a fixed-bed filter, which can be designed as an open or closed filter, especially as a single-bed filter, two-bed filter or mixed-bed filter. Substances which are colloidally present and a portion of the truly dissolved substances are converted into a state which can be retained in the filter with the aid of a coagulant added to the pool water in the infeed of the filter. A portion of the genuinely dissolved substances can be coagulated by chemical sorption. Microorganisms are also retained in the separating precipitate and in the pores of the filter material. Since such microorganisms can multiply in the filter it is required that the filter must be periodically backflushed with the greatest possible efficiency. Normally, coagulants from the series polyaluminum chloride, aluminum sulfate, sodium aluminate, iron-III-chloride and copper sulfate are added to the swimming-pool water before its passage through the filter. The filtrate exiting from the filter passes back into the swimming pool.

Because of the constant discharge of germs by bathers into the swimming-pool water, the treatment of swimming-pool water must also include effective disinfection. This is normally accomplished by chlorination such as is documented in DIN 19643, optionally in combination with an ozonization. Current chlorination methods are the hypochlorous-acid method, the chlorine/bleaching-solution method and the chlorine-chlorodioxide method. The chlorination advantageously takes place in the previously mentioned filtrate.

In order to discharge the floccule separated in the filter and the slime forming because of the organic matter, and to avoid an uncontrolled multiplication of microorganisms in these flocs as well as in the pores of the filter material, special emphasis is given to the backflushing process using wash water removed from the circulation. The effectiveness of the backflushing process considerably determines the quality of the filtrate. In many instances the clogging material is removed from the filters only by the physical action of the water. However, such purification is incomplete because slimy precipitation products as well as biomass remain permanently adhered to the filter material. Thus, there is the risk that microorganisms which are often infectious will multiply considerably and be carried into the pool water with the filtrate. In order to prevent or at least reduce the risk of a contamination of the filter with critical microorganisms such as *Legionella pneumophila* or *Pseudomonas aeruginosa* or fecal coliform bacteria an additional disinfection is necessary. In the known filter disinfection with chlorine, the wash water is compounded with chlorine (approximately 10 mg/l) after one or several wash phases and after an exposure time the wash water is removed into a water storage or into a conduit. The use of chlorine in filter disinfection has a number of disadvantages: Chlorine does have an excellent germicidal action; however, slime and algae are insufficiently separated from the surface of the filter material, so that microorganisms continue to be hidden. A further significant disadvantage can be seen in the fact that organohalogen compounds are formed by the interaction of chlorine with organic substances, which increases the content of undesirable AOX substances (adsorbable organic halogens). In addition, when such wash water is discharged into the sewage system, the breakdown action in biological clarification stages of a sewage treatment plant can be diminished, also by the high residual amounts of chlorine compounds which continue to be active.

The use of ozone rather than chlorine as disinfectant in filter backflushing is also known. Ozone has, like chlorine, a very good microbiocidal action; however, significant investment costs are required for the installation of an ozonization system as well as for the additional corrosion protection and safety devices.

Note concerning the general state of the art the monograph "Aufbereitung von Schwimmbadwasser" [German= Preparation of Water for a Swimming Pool], Wilhelm Herschman, Krammer-Verlag, 1980. Chapter 2.1 treats coagulative filtration (pages 34–41), chapter 2.9 the filter materials and auxiliary chemicals (pages 61–64) and chapter 3 the disinfection of bath water. DIN 19643 also teaches the preparation of swimming-pool water.

SUMMARY OF THE INVENTION

It is an object of the invention to provide an improved method for the treatment of swimming-pool water which comprises the steps of filtration via a fixed-bed filter, chlorination of the swimming-pool water and periodic backflushing of the filter. The method is simple to carry out, reduces the risk of a reintroduction of possibly infectious microorganisms into the pool water and raises the water quality of the discharged wash water thereby avoiding problems in sewage treatment plants and making it possible to comply with regulations for the discharge of waste water. In addition, the method of the invention can be integrated into existing preparation systems for swimming-pool water without significant additional investment and with low technical expense.

The method for treating swimming-pool water comprises filtration of the swimming-pool water via a fixed-bed filter, chlorination of the swimming-pool water and periodic backflushing of the filter with wash water to which a disinfectant is added prior to or in the filter, and removal of the used wash water. The method is characterized in that a peroxycarboxylic acid with one to six C atoms is used as disinfectant.

The filtration and disinfection of the swimming-pool water take place in a known manner using the fixed-bed filters and filter materials customary in the professional world as well as using known methods for chlorinating the filtrate. The previously cited literature is referred to regarding these steps. Customary filter materials for the fixed-bed filters to be used are filter sand and filter gravel, anthracite coal and granulated activated carbon as well as diatomaceous earth and pumice. Different filter materials are used in two-layer and mixed-bed filters.

In accordance with the invention, it is possible, by using a low peroxycarboxylic acid, especially an aqueous solution containing peroxycarboxylic acid and hydrogen oxide as disinfectant, to disinfect the filter very effectively and at the same time to detach the film and slime adhering on and in the filter material, therewith delaying a recontamination with microbes and/or a reduction of the permeability of the filter material. It is believed that the improved detachment of the slime from the surface of the filter material is significantly traceable to the fact that oxygen is released from the available oxygen contained in the disinfectant.

Because the disinfectant used in accordance with the invention during the backflushing of the filter is free of chlorine, no organochlorine compounds are produced and thus the AOX content does not increase. The AOX content in the removed wash water thus corresponds at a maximum to that contained initially when pool water is used as wash water. Since no new AOX compounds are formed in the backflushing process of the invention, problems resulting in sewage treatment plants are significantly reduced. Rather, organic components are further oxidized by the active oxygen compounds introduced with the disinfectant so that the CSB content (chemical oxygen requirement) of the discharged wash water is even reduced. Since filters which have been treated by the method of the invention contain no slime or a distinctly reduced amount after the washing process, the amount and the risk of trapping and repeated removal of microorganisms has been reduced, and the quantity of chlorination agents required in the pool water can be reduced. This lowers the operating costs and at the same time reduces the exposure of bathers to chlorine-containing substances.

As a result of the improved purification action, the filters backflushed in accordance with the invention have an increased performance or service life so that the volume of the filters and therewith their size can be reduced. This also has the advantage of lowering investment costs.

Whereas the *Escherichia coli* occurring in the pool water can be effectively killed off at a concentration of 0.02 to 0.03 mg chlorine per 1, higher concentrations are necessary to combat other microorganisms, so that in practice a chlorine concentration in a range of 0.3 to 0.6 mg/l is needed. This concentration is sufficient to effectively kill off *Pseudomonas aeruginosa* but not to reduce the formation of slime. In contrast thereto, it is possible using a disinfectant containing peroxycarboxylic acid to penetrate and detach the slime at a low concentration, thereby killing off and eliminating *Pseudomonas aeruginosa* as well as Legionnellae.

The disinfectants to be used in accordance with the invention contain one or several peroxycarboxylic acids with 1 to 6 C atoms, especially peroxyformic acid, peroxyacetic acid and peroxypropionic acid. The following can also be used: Peroxyhydroxycarboxylic acids such as peroxylactic acid, and water-soluble mono- and diperoxycarboxylic acids of dicarboxylic acids such as succinic acid, glutaric acid and adipic acid and their mixtures. Peroxycarboxylic acids are often designated in a simplified manner as percarboxylic acids. The agents preferably contain peroxyacetic acid or a mixture of peroxyacetic acid and peroxyformic acid. According to an especially preferred embodiment a so-called equilibrium peroxyacetic acid is used as disinfectant. This denotes reaction mixtures in equilibrium which are formed by reacting a carboxylic acid with aqueous hydrogen peroxide, usually in the presence of a mineral-acid catalyst. Such solutions generally contain 0.1 to 40% hydrogen peroxide and the acetic acid which appears in the equilibrium. Equilibrium peracetic-acid solutions with a content in a range of approximately 2 to 15% by weight, especially 2 to 5% by weight peroxyacetic acid are especially preferred.

According to a further embodiment, 0.1 to 10% by weight formic acid, especially 0.1 to 5% by weight formic acid, are added to an aqueous solution containing peroxyacetic acid and hydrogen peroxide; this addition takes place at least 1 minute, preferably 10 to 100 minutes before the reaction mixture is used. The addition of formic acid also forms peroxyformic acid and a new equilibrium is adjusted during the standing of the mixture. According to an alternative embodiment, a source for formic acid, for example, a formic-acid ester or formate, preferably an alkali- or alkaline-earth metal formate, is added to a solution containing peroxyacetic acid and hydrogen peroxide. It is advantageous if less than 1 equivalent formate per equivalent mineral acid, which is usually contained in the equilibrium peroxycarboxylic-acid solution in an amount of 0.1 to 3% by weight, is added. The peroxyformic acid developing by the addition of formic acid or formate is more effective and, in particular, more rapidly active than peroxyacetic acid alone.

For backflushing, the disinfectant is advantageously added to the wash water in front of the filter. The amount added preferably corresponds to an amount of at least 0.01 mg, preferably 0.05 to 5 mg peroxycarboxylic acid per 1 wash water. Since peroxycarboxylic-acid solutions usually also contain hydrogen peroxide, the latter is supplied to the wash water at the same time, usually in an amount of at least 1 mg/l, preferably 1 to 100 mg/l. Disinfectant solutions containing peroxyacetic acid and peroxyformic acid are preferably produced from a commercial equilibrium peroxyacetic acid and formic acid or sodium formate shortly before use on site.

The use of a solution containing peroxycarboxylic acid as disinfectant for water circuits is known. However, its use in the backflushing of filters in the treatment of swimming-pool water including chlorination has never been considered in the past. As described above, the use of peroxycarboxylic-acid solutions results in an extraordinary combination of advantages both as regards the quality of the swimming-pool water and also of the discharged wash water. In addition, the service life of the filter can be extended without risking the quality of the pool water since the filter material is cleaned off much more effectively with each backflushing process than when using a chlorine-based disinfectant. As a result of the degradation of the slime jacket and the associated, improved penetration depth of the peroxygen-based disinfectant and of the improved flowthrough, a smaller filter size is sufficient and/or a better effect is achieved. Finally, the possible reduction of the chlorine content in the pool water is a significant advantage which is appreciated by the swimmers due to the recognized, negative effects on the skin and the eyes by chlorine and which, in addition, protects the environment and results in a lowering of the operating expenses for water treatment.

DETAILED DESCRIPTION OF THE INVENTION

Example B 1 and Reference Examples VB 1 and VB 2

Tests were performed to determine the effectiveness of backflushing with a filter with the following technical parameters.

| | |
|---|---|
| Filter type: | closed construction |
| Filter diameter (m): | 0.8 |
| Filter area (m$^2$): | 0.5 |
| linear filtering rate (m$^3$/m$^2 \leftarrow$ h): | 30 |
| Filter layer height (mm): | 1200 |
| Filter material: | Filter sand acc. to DIN 19623 |
| Grain size (mm) | 0.71–1.25 |

WASH WATER:

VB 1: Customary, exclusively with water from the water storage

VB 2: Compounded with 10 mg/l free chlorine—addition as NaOCl solution (for more details see number 10.2.2 of DIN 19643—part 1)

B 1: Compounded with 10 mg/l of an aqueous equilibrium peroxyacetic-acid solution with a content of 2% by weight peroxyacetic acid and 48% by weight hydrogen peroxide (=Clarmarin® 503 of Degussa AG).

TABLE

| Parameter | Unit | VB 1 | | | VB 2 | | | B 1 | | |
|---|---|---|---|---|---|---|---|---|---|---|
| Time | Min | 1' | 2' | 10' | 1' | 2' | 10' | 1' | 2' | 10' |
| Wash water requirement | m$^3$/m$^2$ | | 6 | | | 6 | | | 6 | |
| Washing rate | m$^3$/m$^2$h | | 65 | | | 65 | | | 65 | |
| Washing time | min | | 10 | | | 10 | | | 10 | |
| Colony number 20 ± 2° C. | 1/ml | 10$^3$ | 10$^4$ | 0 | 0 | 0 | 0 | 0 | 0 | 0 |
| Colony number 36 ± 1° C. | 1/ml | 10$^2$ | 10$^2$ | 0 | 0 | 0 | 0 | 0 | 0 | 0 |
| *E. coli* | 1/(100 ml) | pos. | pos. | neg. | neg. | neg. | neg. | neg. | neg. | neg. |
| Coliform germs | 1/(100 ml) | pos. | pos. | neg. | neg. | neg. | neg. | neg. | neg. | neg. |
| *Pseudomonas aeruginosa* | 1/(100 ml) | pos. | neg. | neg. | neg. | neg. | neg. | neg. | neg. | neg. |
| *Legionella pneumophila* | 1/(100 ml) | pos. | neg. | neg. | neg. | neg. | neg. | neg. | neg. | neg. |
| Free chlorine | mg/l | <0.03 | <0.03 | 0.15 | 3.14 | 5.52 | 8.77 | <0.03 | <0.03 | <0.03 |
| chloramine | mg/l | 0.45 | 0.61 | 0.20 | 0.92 | 0.32 | 0.18 | 0.08 | 0.10 | 0.05 |
| THM = (trihalogenmethane) | µg/l | 76 | 101 | 34 | 145 | 202 | 18 | 27 | 34 | 14 |
| AOX (= haloorganic compounds) | µg/l | 202 | 242 | 76 | 344 | 586 | 187 | 64 | 69 | 40 |

It follows from reference example VB1 that a longer washing time is necessary for reliably obtaining germ-free water; in addition, the discharged wash water contains significant amounts of readily and difficultly degradable chloroorganic compounds.

It follows from reference example VB 2 that the addition of a disinfectant of an admissible chlorine product (NaOCl) does permit a sufficient effectiveness of the discharge of microbial contaminants; however, this creates serious disadvantages as haloorganic compounds (=increase of the AOX value) are formed in the filter bed itself during the particular backflush procedure. However, this provides no information about the location of microorganisms in the slime.

The filter washing in accordance with the invention and example B1 using an equilibrium peroxyacetic acid as disinfectant results:

In a largely complete detachment of the organic contaminant from the grain, as a result of which an extended filter service life becomes possible;

In a largely complete germicidal killing off of microorganisms after a short backflush time by the peroxy compounds present in the disinfectant;

In a reduction of the discharge of haloorganic compounds and therewith in an effective protection of the environment and maintenance of the conditions for the introduction of waste water.

While the invention has been described in what is presently considered to be the most practical and preferred embodiments, it is to be understood that it is not to be limited by the examples given, but is intended to cover further advantages and embodiments within the scope of the following claims. Publications cited herein are hereby incorporated by reference.

What is claimed is:

1. A method of treating swimming pool water comprising filtration of the water via a fixed-bed filter, chlorination of the water and periodic backflushing of the filter with wash water to which a disinfectant is added either in front of or in the filter, and removal of the used wash water, wherein the disinfect includes a peroxycarboxylic acid with one to six carbon atoms.

2. The method according to claim 1, wherein an aqueous solution containing hydrogen peroxide and a peroxycarboxylic acid is used as the disinfectant in an amount corresponding to at least 0.01 mg peroxycarboxylic acid and at least 1 mg hydrogen peroxide per liter wash water.

3. The method according to claim 2, wherein said peroxycarboxylic acid is peroxyacetic acid and/or peroxyformic acid.

4. The method according to claim 2 wherein the disinfectant is added to the wash water in front of the filter.

5. The method according to claim 2, wherein an equilibrium peroxyacetic acid is compounded with 0.1 to 5% by weight formic acid or a compound which releases formic acid in the equilibrium peroxyacetic acid, and the mixture is allowed to react for at least 1 minute before being added to the wash water.

6. The method according to claim 5 wherein the compound which releases formic acid in the equilibrium peroxyacetic acid is an alkali metal formate.

7. The method according to claim 5 wherein the mixture is allowed to react for 10 to 100 minutes before being added to the wash water.

8. The method according to claim 1 wherein the disinfectant is added to the wash water in front of the filter.

9. The method of claim 8 wherein the disinfectant is an equilibrium peroxyacetic acid.

10. The method according to claim 1, wherein the disinfectant is added in an amount corresponding to 0.05 to 5 mg peroxycarboxylic acid and 1 to 100 mg hydrogen peroxide per liter wash water.

11. The method according to claim 1, wherein an aqueous solution with a content of 0.1 to 15% by weight peroxyacetic, 20 to 50% by weight hydrogen peroxide and 0 to 15% by weight peroxyformic acid is used as the disinfectant.

12. The method according to claim 11 wherein 1 to 5% by weight peroxyacetic acid is used.

* * * * *